J. W. FORCE
Nursery and Medical Spoons.

No. 212,677. Patented Feb. 25, 1879.

Witnesses:
Joseph K. Makepeace
Allen Webster

Inventor:
John W. Force

UNITED STATES PATENT OFFICE.

JOHN W. FORCE, OF SPRINGFIELD, MASSACHUSETTS.

IMPROVEMENT IN NURSERY AND MEDICAL SPOONS.

Specification forming part of Letters Patent No. 212,677, dated February 25, 1879; application filed June 29, 1878.

*To all whom it may concern:*

Be it known that I, JOHN W. FORCE, of Springfield, county of Hampden, and State of Massachusetts, have invented a new and useful Improvement in Nursery and Medicine Spoons; and I do hereby declare that the following is a full, clear, and exact description of the construction and operation of the same, reference being had to the annexed drawings, making a part of this specification, and to the letters of reference marked thereon.

Figure 1:
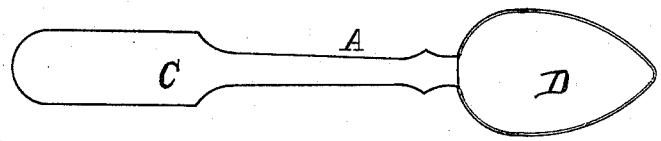
Figure 2:
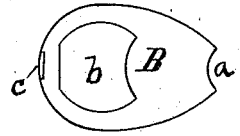
Figure 3:
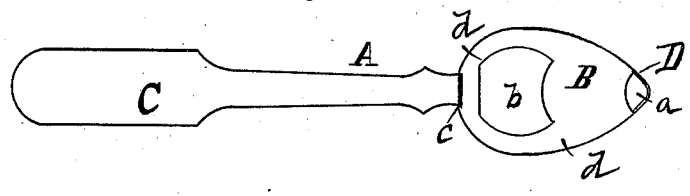

Figure 1 represents an ordinary spoon. Fig. 2 represents my improvement or partial cover and rim. Fig. 3 represents the spoon and partial cover and rim solidly attached and complete.

In the medicine-spoons now in use, the common spoon has been provided with a detachable sliding lid having turned edges covering the bowl portion of the spoon, but leaving an opening at the tip, so that the contents can escape when introduced into the mouth of the patient; also, an aperture at the rear end of the bowl, whereby the bowl can be readily filled when immersed in a liquid, or else a convex cover of the same size as the bowl, with a crescent-shaped opening at the point, has been hinged at the connecting-point between bowl and handle; also, a mustache-spoon has been provided with a shield, with an opening attached to only one side of the bowl, so as to leave about one-half of the bowl exposed. These constructions of spoons, it has been found by use, are by no means satisfactory for the object herein stated.

In the examples above mentioned, the liquid or contents of the spoon will spill or overflow the exposed or uncovered edges of the bowl. On the other hand, in the example of the hinged covered spoon, the liquid medicine will escape at the sides in the joint between the cover and bowl by a slight tilt or unsteady handling of the spoon.

To remedy these defects and others, as well as to produce a useful, simple, and cheap medicine-spoon, is the object of my invention; and to this end it consists in the bowl of a tea-spoon or other spoon provided with a convex shield with an overhanging continuous surrounding flange, forming a component part of the spoon, and having a central and end opening only for the introduction and discharge of the medicine to and from the bowl of the spoon, whereby a means is provided for confining the liquid and preventing the same from spilling or escaping, as will be hereinafter more fully set forth.

In the accompanying drawings, forming a part of this specification, the letter A represents an ordinary tea-spoon, consisting of the handle C and bowl D.

The letter B indicates the convex shield, stamped or otherwise formed from the proper metal, and of the same size of the spoon-bowl. This shield is formed with a recess, $a$, at the point or forward end of the shield, an intermediate opening, $b$, centrally arranged, or nearly so, and a shouldered recess, $c$, at the rear end, substantially as shown.

The convex shield is now adjusted and attached to the bowl of the spoon by soldering or otherwise firmly securing the contiguous side and rear edges of the parts together, thus making a close joint between the shield and bowl. By this construction and union of the parts I have a medicine-spoon substantially like that shown in Fig. 3 of the drawings, provided with the central opening $b$ and point or funnel-opening $a$, for the purpose hereinafter stated.

The medicine to be given to the patient from the spoon is passed from the bottle or other vessel through the opening $b$ into the bowl of the spoon, and the surrounding flange $d$, overhanging the edges of the bowl, prevents any possible running out or spilling of the medicine from the bowl of the spoon, caused by tilting or not holding the spoon level, except at the discharge-opening.

The medicine is emptied from the bowl of the spoon through the discharge-opening $a$ at the point where introduced into the mouth of the patient, and the opening $b$ admitting sufficient air to allow the contents to run freely.

The important feature of my invention is the overhanging surrounding flange to confine or imprison the liquid within the bowl from escape at any point except at the discharge-aperture.

What I claim as my invention is—

As an improved article of manufacture, the medicine-spoon consisting of the handle C and bowl D, with cover B, rigidly attached to the side and rear edges of the bowl, and provided with the opening $b$, for the introduction of the medicine and air to the bowl, and the escape-opening $a$, substantially as shown and set forth.

JOHN W. FORCE.

Witnesses:
ALLEN WEBSTER,
JOSEPH K. MAKEPEACE.